United States Patent
Berglund et al.

(10) Patent No.: US 6,915,440 B2
(45) Date of Patent: Jul. 5, 2005

(54) APPARATUS, PROGRAM PRODUCT AND METHOD OF PERFORMING POWER FAULT ANALYSIS IN A COMPUTER SYSTEM

(75) Inventors: Neil Clair Berglund, Mantorville, MN (US); John Nicolaus Tietjen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 09/879,725

(22) Filed: Jun. 12, 2001

(65) Prior Publication Data

US 2002/0188873 A1 Dec. 12, 2002

(51) Int. Cl.$^7$ ................................................ G06F 1/28
(52) U.S. Cl. ...................................... 713/340; 713/310
(58) Field of Search ................................ 713/300, 310, 713/330, 340

(56) References Cited

U.S. PATENT DOCUMENTS

| | | | |
|---|---|---|---|
| 4,533,865 A | | 8/1985 | Schlenk ........................ 324/51 |
| 4,677,566 A | * | 6/1987 | Whittaker et al. ........... 700/295 |
| 5,117,430 A | | 5/1992 | Berglund .................... 370/85.1 |
| 5,557,777 A | | 9/1996 | Culbert |
| 5,724,542 A | * | 3/1998 | Taroda et al. ................ 711/113 |
| 5,935,252 A | | 8/1999 | Berglund et al. ............ 713/300 |
| 5,951,686 A | | 9/1999 | McLaughlin et al. |
| 6,044,411 A | | 3/2000 | Berglund et al. ............... 710/9 |
| 6,052,793 A | | 4/2000 | Mermelstein |
| 6,055,581 A | * | 4/2000 | Berglund et al. ............. 710/11 |
| 6,122,256 A | | 9/2000 | Berglund .................... 370/241 |
| 6,122,758 A | * | 9/2000 | Johnson et al. ............... 714/47 |

FOREIGN PATENT DOCUMENTS

EP 517403 A2 12/1992

OTHER PUBLICATIONS

IBM Technical Disclosure Bulletin, "Fault Indicator Software Support for Unattended Operational Personal Computer Systems," vol. 34, No. 1, Jun. 1991, pp. 202–204.
U.S. Appl. No. 09/265,394, Movall et al., "Addition of Slot, Backplane, Chassis and Device Parametric Properties to Vital Product Data (VPD) in a Computer System", filed Mar. 10, 1999.

* cited by examiner

Primary Examiner—Dennis M. Butler
(74) Attorney, Agent, or Firm—Matthew J. Bussan (57) ABSTRACT

A power fault diagnostic mechanism for a computer system having a power system that includes a controller. A variable is recorded in a non-volatile memory associated with the power system. The variable assumes a first state when the computer system is powered on and operating. The variable remains in the first state until it enters a second state when the computer system is powered off in response to a power-off request. The controller operates in a standby mode when the computer system is powered off. Upon being powered up, e.g., after a utility power disturbance, the controller reads the variable in the non-volatile memory. This allows determination of whether a disturbance has occurred, even when the computer system was powered off. The controller maintains a local error log based on the variable accessed from the non-volatile memory. A system error log is updated by the operating system using the local error log.

26 Claims, 7 Drawing Sheets

APPARATUS, PROGRAM PRODUCT AND METHOD OF PERFORMING POWER FAULT ANALYSIS IN A COMPUTER SYSTEM

FIELD OF THE INVENTION

The present invention relates in general to computer systems. More particularly, the present invention relates to an apparatus, program product and method of performing power fault analysis in a computer system.

BACKGROUND

The development of the EDVAC computer system of 1948 is often cited as the beginning of the computer era. Since that time, computer systems have evolved into extremely sophisticated devices, and computer systems may be found in many different environments. Since the dawn of the computer age, the performance of computers has been measured to determine how well the computer performs certain tasks. One measure of computer performance is reliability, availability and serviceability (RAS). Diagnostic mechanisms are often provided to increase the RAS of computer systems. In general, diagnostic mechanisms detect and analyze errors or faults that occur in the hardware and software portions of a computer system while the system is being tested or operated. A diagnostic mechanism in a computer system typically detects errors or faults as they occur and logs such errors or faults for later analysis by a diagnostic program.

For example, a power fault diagnostic mechanism in a computer system detects and analyzes faults in the power system of the computer system. The terminology "power system" is used herein to broadly define the system that applies power to various electronic components of the computer system, such as the central electronics complex (CEC), mass storage devices, etc. Detecting and analyzing faults in the power system is complicated by the interactions and false indications caused by utility power disturbances. Such disturbances occur when the input power provided to the power system, typically from a utility, falls outside of specified limits for varying amounts of time from milliseconds to hours. Utility power disturbances include total outages, often referred to as blackouts, and power reductions, often referred to as brownouts, and transient distortions.

Conventional power fault diagnostic mechanisms typically employ an alternating current (AC) loss detector to detect utility power disturbances. Nonetheless, when a utility power disturbance occurs, conventional power fault diagnostic mechanisms often give a false indication or no indication of what happened. If detected, the utility power disturbance is logged into volatile memory. Since the loss of power can be sudden and unexpected, there is typically no time to create a non-volatile record of the event once it happens. If the utility power disturbance persists long enough, the volatile record of the event is lost. Since no log of the fault remains, the conventional power fault diagnostic mechanism in this situation can provide no indication of what happened. In the false indication situation, the conventional power fault diagnostic mechanism provides a false indication that a fault occurred in the power system because the AC loss detector failed to detect a utility power disturbance. An AC loss detector may fail to detect a utility power disturbance for a variety of reasons. For example, the threshold at which the AC loss detector detects a utility power disturbance may be set relatively high to avoid false positives due to variances in the power system, its load and the AC loss detector. Likewise, the power system may be affected by a utility power disturbance that is not detected by the AC loss detector due to factors such as wave shape or harmonics, the response time of the AC loss detector, etc. Each of these situations, i.e., the no indication situation and the false indication situation, is likely to lead to an unnecessary service call and possibly to the unnecessary replacement of power system components.

U.S. Pat. No. 4,533,865 to Schlenk discloses a circuit arrangement for identifying and storing power line faults in data processing systems. A rectified power line voltage is supplied to a comparison circuit for comparison to a reference voltage. When the rectified power line voltage falls below the reference voltage, the event in recorded in a memory that comprises a bistable relay. As a result, power line faults remain stored despite the return of power line input voltage. However, the comparison scheme used by this circuit arrangement provides inconsistent results. On one hand, the circuit arrangement may identify a utility power disturbance that does not affect the power system due to variances in the power system, its load and the circuit arrangement. In other words, the circuit arrangement may indicate a utility power disturbance that the power system rides through. On the other hand, the power system may be affected by a utility power disturbance that is not identified by the circuit arrangement due to factors such as wave shape or harmonics, the response time of the circuit arrangement, etc. Moreover, the circuit arrangement employs an inhibit signal to block the memory both during run up of the rectified power line input voltage and when the overall data processing system is turned off. As with the comparison scheme, differences in thresholds may cause different, inconsistent results during the run-up inhibit. Also, employing the inhibit signal when the data processing system is turned off will prevent the circuit arrangement from recording a utility power disturbance that could have affected the system had the system been turned on. Finally, the circuit arrangement adds significant cost to the data processing system.

Therefore, there exists a need to provide an enhanced power fault diagnostic mechanism that better identifies and records utility power disturbances.

SUMMARY OF THE INVENTION

An object of the present invention is to provide an enhanced power fault diagnostic mechanism that addresses these and other problems associated with the prior art.

These and other objects of the present invention are achieved by providing an apparatus, program product, and method of performing power fault analysis in a computer system that utilize a state variable stored in non-volatile memory, the state of which depends upon whether or not the computer system was powered down in response to a power-off request. A power system, which includes a control device, receives utility power and applies power to electrical components of the computer system. The state variable is recorded in a non-volatile memory field of an information circuit associated with the power system. The state variable assumes a first state when the computer system is powered on and operating. The state variable remains in the first state until it enters a second state when the computer system is powered off in response to a power-off request. Upon being powered up, e.g., once utility power is restored following a utility power disturbance, the control device reads the state variable in the non-volatile memory field of the information circuit. This allows the control device to determine that a utility power disturbance has occurred when the state variable read by the control device is in the first state. In other words, the computer system shut down as a result of a utility power disturbance without benefit of the power-off command. This determination provides evidence that the shut down was the result of a utility power disturbance. Consequently, an unnecessary service call may be avoided, as well as unnecessary replacement of power system components. Moreover, the use of a prior art detector (e.g., an AC loss detector), and its inherent cost and threshold related inconsistencies, can be avoided.

The information circuit is preferably a vital product data (VPD) circuit having a non-volatile memory, such as a non volatile random access memory (NVRAM), various types of programmable read only memory (PROM), complementary metal oxide semiconductor (CMOS) memory, flash memory, etc.

Preferably, the control device maintains a local error log that includes an entry based on the state variable accessed from the information circuit. The operating system may then record an entry in a system error log based on the contents of the local error log. The entry in the local error log and/or the system error log is preferably time stamped to provide a timeline of utility power disturbance events.

The control device preferably operates in a standby mode when the computer system is powered off. This allows the control device to determine that a utility power disturbance has occurred, even when the computer system was powered off. In other words, if a utility power disturbance occurs after the computer system was already shut down in response to a power-off request, the state variable read by the control device will be in the second state. This determination is advantageous because it allows the utility power disturbance to be investigated and corrected, preferably before any repeat of the disturbance event while the computer system is operating. Consequently, a future unnecessary service call in may be avoided, as well as unnecessary replacement of power system components. Again, the use of a prior art detector (e.g., an AC loss detector), and its inherent cost and threshold related inconsistencies, can be avoided.

The computer system may have a plurality of frames each having at least one of the power systems, each frame being linked through a system power control network (SPCN). In this case, a local error log is maintained in each of the frames by that frame's control device. The operating system may access the local error logs maintained in the respective frames individually for entry into the system error log 80.

BRIEF DESCRIPTION OF THE DRAWINGS

The present invention together with the above and other objects and advantages can best be understood from the following detailed description of the embodiments of the invention illustrated in the drawings, wherein like reference numerals denote like elements.

DETAILED DESCRIPTION OF THE PREFERRED EMBODIMENTS

Hardware and Software Environment

Figure 1:
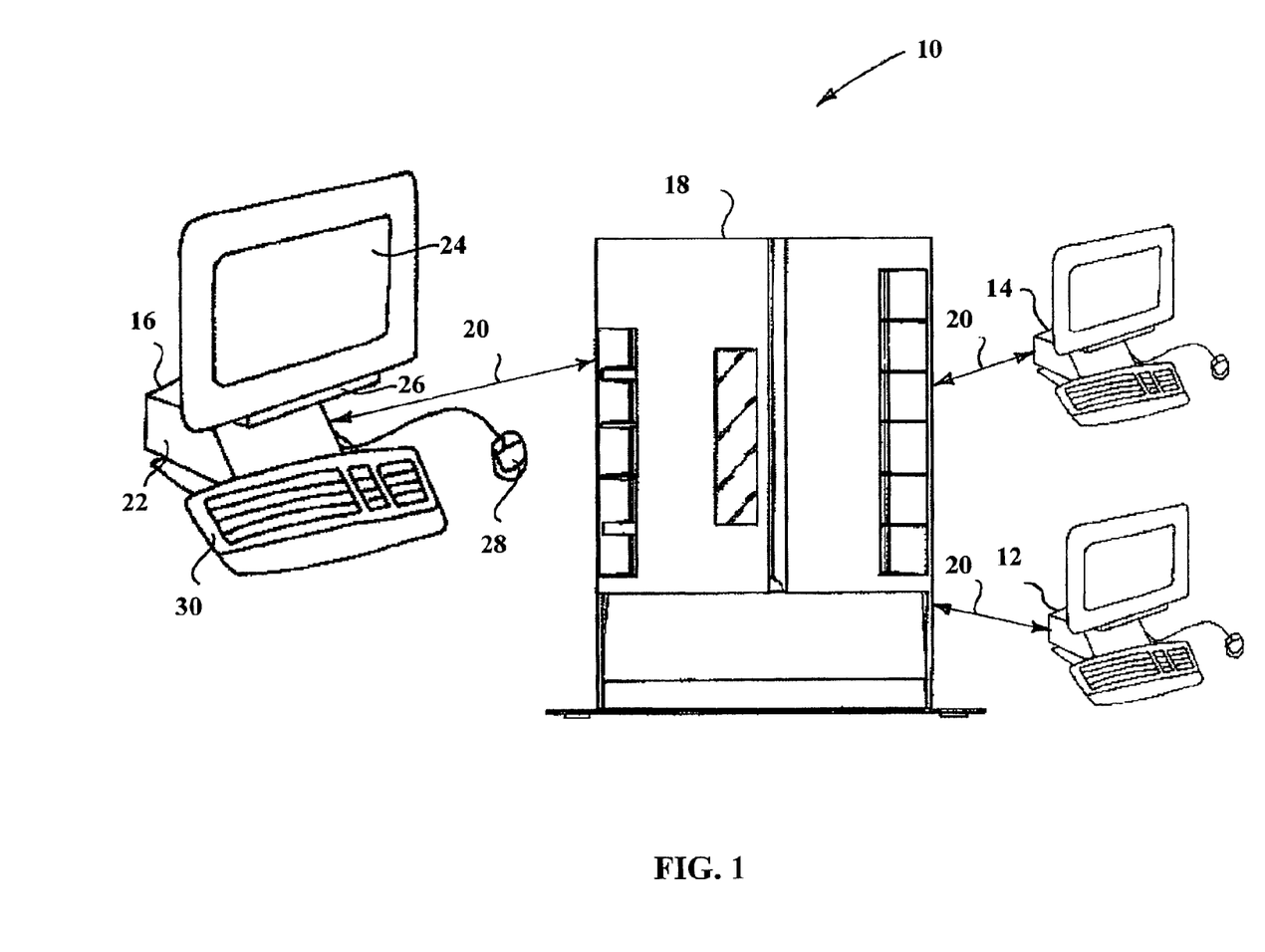
FIG. 1 is a block diagram of a networked computer system consistent with the present invention.

FIG. 1 illustrates a computer system 10 that is consistent with the invention. Computer system 10 is illustrated as a networked computer system. Computer system 10 includes one or more client computers 12, 14 and 16 (e.g., desktop or PC-based computers, workstations, etc.) coupled to server computer 18 (e.g., a PC-based server, a minicomputer, a midrange computer, a mainframe computer, etc.) through a network 20. As discussed in more detail below, the server computer 18 may comprise a plurality of enclosures as an alternative to the single enclosure illustrated in FIG. 1. These enclosures may be coupled to each other through a system data, address and control interconnection, such as a host system bus. In addition, these enclosures may be coupled to each other through a system power control network (SPCN). Network 20 may represent practically any type of networked interconnection. For example, network 20 may be a local-area network (LAN), a wide-area network (WAN), a wireless network, and a public network (e.g., the Internet). In addition, network 20 may include a power control network. Moreover, any number of computers and other devices may be networked through the network 20, e.g., multiple servers.

Client computer 16, which may be similar to client computers 12 and 14, may include a central processing unit (CPU) 22; a number of peripheral components such as a computer display 24; a storage device 26; and various input devices (e.g., a mouse 28 and a keyboard 30), among others. Server computer 18 may be similarly configured, albeit typically with greater processing performance and storage capacity, as is well known in the art.

Figure 2:
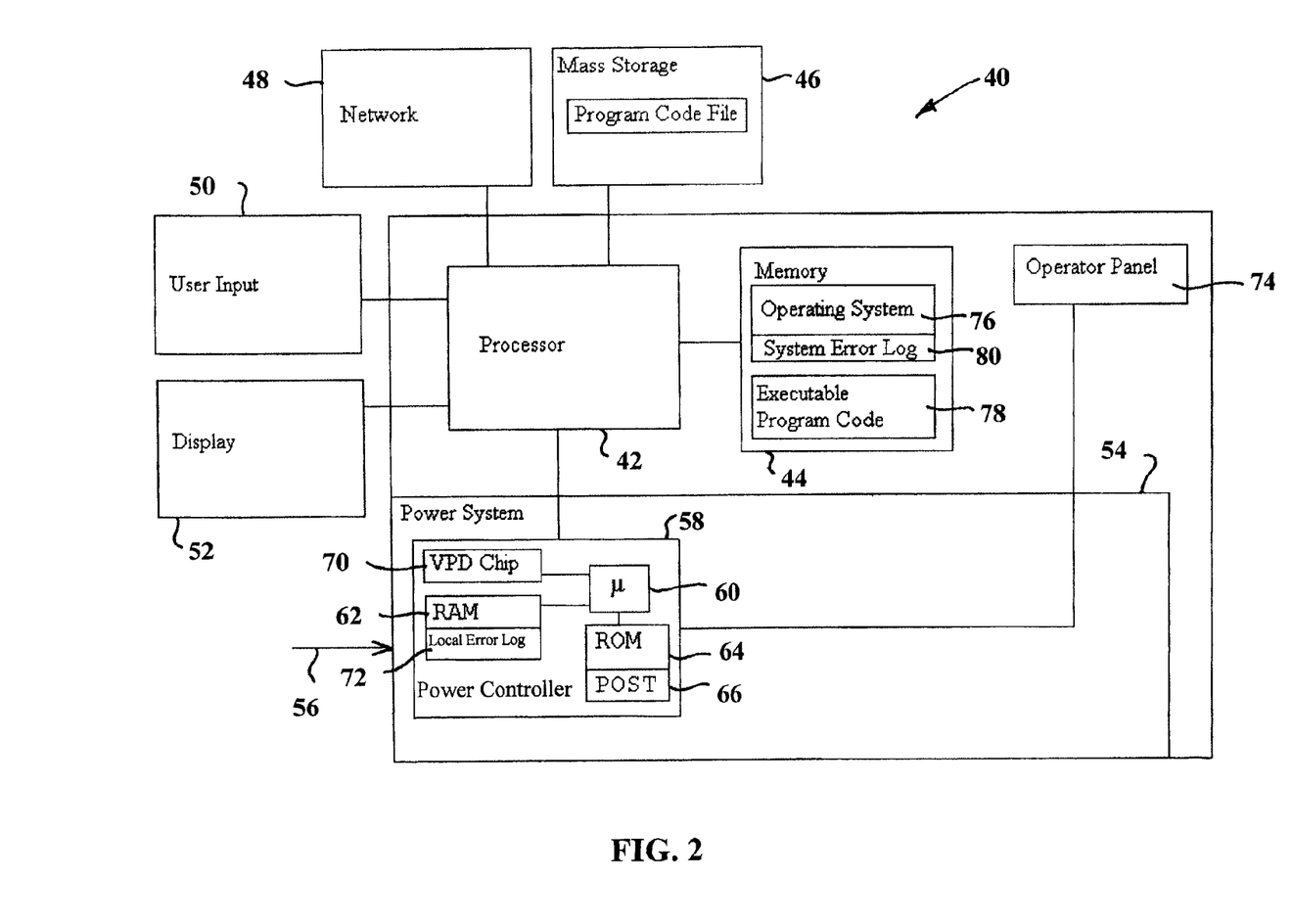
FIG. 2 is a block diagram of an exemplary hardware and software environment for a computer system from the networked computer system of FIG. 1.

FIG. 2 illustrates in another way an exemplary hardware and software environment for an apparatus 40 consistent with the present invention. For the purposes of the present invention, apparatus 40 may represent practically any type of computer, computer system or other programmable electronic device, including a client computer (e.g., similar to client computers 12, 14 and 16 of FIG. 1), a server computer (e.g., similar to server computer 18 of FIG. 1), a portable computer, an embedded controller, etc. Apparatus 40 may be coupled in a network as shown in FIG. 1, or may be a stand-alone device in the alternative. Apparatus 40 will hereinafter also be referred to as a "computer", although it should be appreciated the term "apparatus" may also include other suitable programmable electronic devices consistent with the present invention.

Computer 40 typically includes at least one processor 42 coupled to a memory 44. Processor 42 may represent one or more processors (e.g., microprocessors), and memory 44 may represent the random access memory (RAM) devices comprising the main storage of computer 40, as well as any supplemental levels of memory, e.g., cache memories, non-volatile or backup memories (e.g., programmable or flash memories), read-only memories, etc. In addition, memory 44 may be considered to include memory storage physically located elsewhere in computer 40, e.g., any cache memory in a processor 42, as well as any storage capacity used as a virtual memory, e.g., as stored on a mass storage device 46 or on another computer coupled to computer 40 via a network 48.

Computer 40 also typically receives a number of inputs and outputs for communicating information externally. For interface with a user or operator, computer 40 typically includes one or more user input devices 50 (e.g., a keyboard, a mouse, a trackball, a joystick, a touchpad, and/or a microphone, among others) and a display 52 (e.g., a CRT monitor, an LCD display panel, and/or a speaker, among others). It should be appreciated, however, that with some implementations of computer 40, e.g., some server computer implementations, direct user input and output may not be supported by the computer.

For additional storage, computer 40 may also include one or more mass storage devices 46, e.g., a floppy or other removable disk drive, a hard disk drive, a direct access storage device (DASD), an optical drive (e.g., a CD drive, a DVD drive, etc.), and/or a tape drive, among others. Furthermore, computer 40 may include an interface with one or more networks 48 (e.g., a LAN, a WAN, a wireless network, and/or the Internet, among others) to permit the communication of information with other computers coupled to the network.

Computer 40 also typically includes at least one power system 54 that receives utility power 56 and applies power to various electronic components of computer 40, such as a central electronics complex (CEC) (e.g., typically the CEC includes processor 42 and memory 44), mass storage device 46, cooling fans, etc. Power system 54 may represent one or more power systems. The electrical connections that provide power from power system 54 to various electrical components of computer 40 are not shown in FIG. 2 for the sake of clarity. These electrical connections are well known in the art. The input power to power system 54 is referred to hereinafter as "utility power" because the input power is typically supplied by an electric utility. However, it should be appreciated that the term "utility power" as used herein may also include other sources of input power, such as batteries, generators, fuel cells, solar, wind, etc.

Power system 54 typically includes a power controller 58. Although power controller 58 is shown in FIG. 2 within power system 54, power controller 58 may be located physically remote from power system 54. Power controller 58 is coupled to processor 42 and forms a portion of a system power control network (SPCN) that is not shown in FIG. 2 for the sake of clarity. SPCNs are well known in the art. As discussed in more detail below, the computer 40 may include a plurality of enclosures in lieu of the single enclosure shown in FIG. 2. Each of the enclosures typically includes its own power supply 54 and power controller 58, and the power controllers 58 are typically coupled to each other through a SPCN that extends between the enclosures. In any event, power controller 58 typically monitors the status of the power conditions at various electrical components of computer 40 (e.g., the CEC, mass storage device 46, cooling fans, etc.) through the SPCN, and makes occasional adjustments to the electrical power provided to these electrical components through the electrical connections of power system 54, as is well known in the art. For example, the SPCN may be a low volume serial network such as disclosed in U.S. Pat. Nos. 5,117,430 and 6,122,256, which are assigned to the assignee of the present application and which are incorporated herein by reference.

The power controller 58 typically includes a microprocessor 60, a dynamic random access memory (RAM) 62 and a read only memory (ROM) 64 that stores a power-on self-test (POST) program 66. POST program 66 performs a test of power controller 58 when utility power 56 is first applied to power controller 58. POST program 66 additionally causes power controller 58 to read a VPD chip 70, which as discussed in more detail below contains a power state variable stored in a non-volatile memory. In addition, ROM 64 typically stores a program (not shown) for monitoring the status of, and making occasional adjustments to, the power conditions at various electrical components of computer 40 (e.g., the CEC, mass storage device 46, cooling fans, etc.), as is well known in the art. Microprocessor 60 is coupled to each of RAM 62, ROM 64 and VPD chip 70. Although RAM 62 and ROM 64 are shown in FIG. 2 within power controller 58, RAM 62 and ROM 64 may be physically remote from power controller 58.

Various elements of computer 40 (e.g., the CEC, power controller 58, mass storage device 46, cooling fans, etc.) may include vital product data (VPD) chips, as is well known in the art. For the sake of clarity, only one VPD chip is shown in FIG. 2. That is, VPD chip 70 associated with power controller 58. The other VPD chips are not germane to this embodiment of the present invention. Each VPD chip is associated with an element of computer 40 and stores vital product data (VPD) information about that associated element. The VPD chips typically store VPD information in a non-volatile memory. The VPD information in the VPD chips is typically written and accessed by power controller 58 through the SPCN, as is well known in the art. Typically, power controller 58 is coupled to an operator panel 74 that may be used to display the status of the power conditions at the monitored elements of computer 40. An exemplary method and apparatus for determining and setting system device configuration relating to power and cooling using VPD circuits associated with system devices may be found in U.S. Pat. No. 5,935,252, which is assigned to the assignee of the present application and which is incorporated herein by reference.

According to an aspect of the present invention, and as discussed in more detail below, power controller 58 accesses and writes to an additional non-volatile memory field (i.e., a power state field) of VPD chip 70 that contains a state variable, the state of which depends on whether or not the computer system was powered down in response to a power-off request. The power state field in VPD chip 70 is written and accessed by power controller 58 through the SPCN in a manner similar to the VPD information. Power controller 58 builds a local error log 72 in RAM 62 that includes an entry based on the state variable accessed from the power state field of VPD chip 70.

It should be appreciated that computer 40 typically includes suitable analog and/or digital interfaces between processor 42 and each of memory 44, mass storage device 46, network 48, user input device 50, display 52 and power controller 58, as is well known in the art. Likewise, it should be appreciated that computer 40 typically includes suitable analog and/or digital interfaces between power controller 58 and operator panel 74, as is well known in the art. It should also be appreciated that power controller 58 typically includes suitable analog and/or digital interfaces between microprocessor 60 and each of RAM 62, ROM 64 and VPD chip 70, as is well known in the art.

Computer 40 operates under the control of an operating system 76, and executes various computer software applications, components, programs, objects, modules, etc. (e.g., executable program 78, among others). Moreover, various applications, components, programs, objects, modules, etc. may also execute on one or more processors in another computer coupled to computer 40 via a network 48, e.g., in a distributed or client-server computing environment, whereby the processing required to implement the functions of a computer program may be allocated to multiple computers over a network.

Operating system 76 typically includes a system error log 80 that contains entries based on the contents of local error log 72. Typically, operating system 76 queries power controller 58 for unreported events. In response to this query, power controller 58 provides operating system 76 with access to local error log 72. Operating system 76 writes each entry from local error log 72 into system error log 80. Preferably, operating system 76 time stamps each entry as it is written into system error log 80. For example, operating system 76 may append a time and date field to the entry based on the system clock. In an alternative arrangement, each entry may be time stamped by power controller 58 when entered into the local error log. Entries in system error log 80 may be viewed by a computer user or service personnel from display 52.

Figure 3:
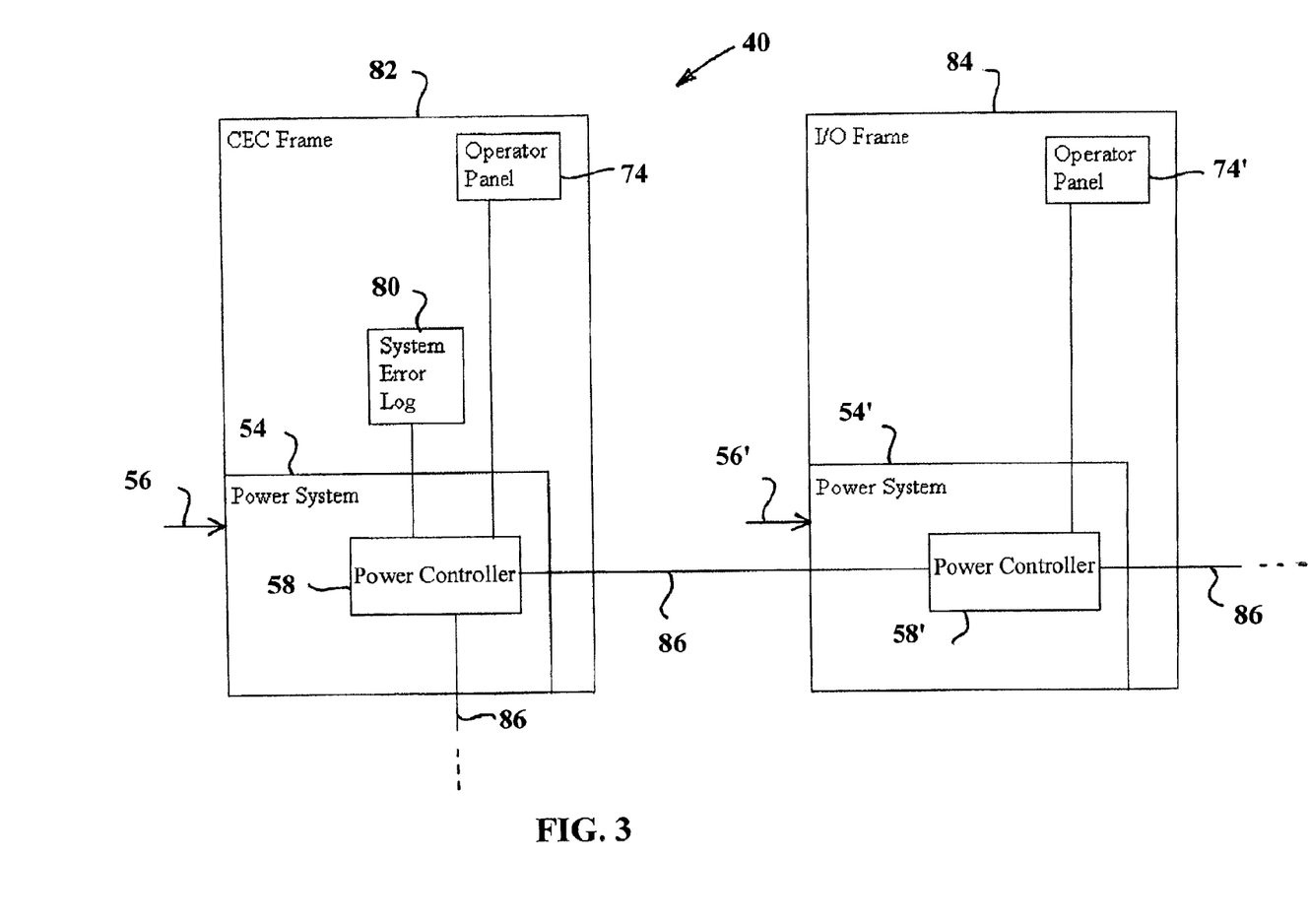
FIG. 3 is a block diagram of a multiple frame embodiment of the exemplary hardware and software environment shown in FIG. 2.

As mentioned above, the computer 40 may comprise a plurality of enclosures, which are referred to herein as frames, in lieu of the single frame illustrated in FIG. 2. Referring now to FIG. 3, a CEC frame 82 is typically coupled to one or more input/output I/O frames 84 through an SPCN 86 and a host bus system (not shown in FIG. 3 for the sake of clarity). Although not shown in FIG. 3 for the sake of clarity, CEC frame 82 typically contains a CEC (e.g., typically the CEC includes a processor and a memory) and an operating system (OS), and I/O frame 84 typically contains additional I/O devices, such as one or more mass storage devices and/or one or more additional processors. CEC frame 82 has power system 54 that receives utility power 56 and includes power controller 58. Similarly, I/O frame 84 has a power system 54' that receives utility power 56' and includes a power controller 58'. The CEC and the operating system (OS) in CEC frame 82 are coupled to the I/O devices in the I/O frame 84 through the host system bus. In addition, power controller 58 in CEC frame 82 is coupled to power controller 58' in I/O frame 84 through SPCN 86. A local error log is maintained in I/O frame 84 by power controller 58', just as a local error log is maintained in CEC frame 82 by power controller 58. The operating system accesses the local error logs maintained in CEC frame 82 and I/O frame 84 individually for entry into system error log 80. The operating system accesses the local error log maintained in I/O frame 84 through SPCN 86.

It should be appreciated that each power system 54 and 54' may be independently connected to utility power and while the entire computer system 40 may experience a utility power disturbance, it is also possible that just one frame may experience a utility power disturbance because the frames are not connected to the same utility circuits. Advantageously, the present invention makes it possible to detect a utility power disturbance that occurs in any frame and to log the event in system error log 80.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1, 2 and 3 are not intended to limit the present invention. Indeed, those skilled in the art will recognize that other alternative hardware and/or software environments may be used without departing from the scope of the invention.

POWER FAULT ANALYSIS

Detecting and analyzing faults in the power system is complicated by the interactions and false indications caused by utility power disturbances. Such disturbances occur when the utility power provided to the power system falls outside of specified limits. Utility power disturbances include total outages (often referred to as blackouts), power reductions (often referred to as brownouts), short duration disturbances (an outage of a few milliseconds duration, for example), etc. Short duration disturbances, which are the most common type of utility power disturbance, may crash a computer but often do not cause room lighting to flash and thereby alert a user that a disturbance has occurred. Prior art power fault diagnostic mechanisms typically address utility power disturbances through the use of AC loss detectors. Unfortunately, the use of such loss detectors introduces several disadvantages including threshold related inconsistencies and additional cost.

The present invention addresses utility power disturbances in a new way that does not require the use of a loss detector. Instead, the present invention uses a state variable stored in non-volatile memory, the state of which depends upon whether or not the computer system was powered down in response to a power-off request. Consequently, the present invention can avoid the threshold related inconsistencies and additional cost inherent in the use of a loss detector.

Referring back to FIG. 2, the state variable is recorded in a non-volatile memory associated with power system 54, preferably in a non-volatile memory field of VPD chip 70. The state variable assumes a first state when computer 40 is powered on and operating. The state variable remains in the first state until it enters a second state when computer 40 is powered off in response to a power-off request. Upon being powered up, e.g., once utility power 56 is restored following a utility power disturbance, power controller 58 reads the state variable in the non-volatile memory field of the VPD chip 70. This allows power controller 58 to determine that a utility power disturbance has occurred when the state variable read by power controller 58 is in the first state. In other words, computer 40 shut down as a result of a utility power disturbance without benefit of the power-off request. This determination provides evidence that the shut down was the result of a utility power disturbance. Consequently, an unnecessary service call may be avoided, as well as unnecessary replacement of power system 54. Moreover, the use of a prior art detector (e.g., an AC loss detector), and its inherent cost and threshold related inconsistencies, can be avoided.

Power controller 58 preferably operates in a standby mode when computer system 40 is powered off. This allows power controller 58 to determine that a utility power disturbance has occurred, even when computer 40 was powered off. In other words, if a utility power disturbance occurs after computer 40 was already shut down in response to a power-off request, the state variable read by power controller 58 will be in the second state. This determination is advantageous because it allows the utility power disturbance to be investigated and corrected, preferably before any repeat of the disturbance event while the computer 40 is operating. Consequently, a future unnecessary service call may be avoided, as well as unnecessary replacement of power system 54. Again, the use of a prior art detector (e.g., an AC loss detector), and its inherent cost and threshold related inconsistencies, can be avoided.

Power controller 58 typically operates on standby power provided by a standby power supply. Accordingly, power controller 58 may react to utility power disturbances differently than computer 40. This is because power controller 58 requires little power compared to the CEC or I/O devices, and thus the inherent capacitance in the standby power supply may cause power controller 58 to "ride through" utility power disturbances that will cause the main power system power supplies to fail, i.e., fall out of regulation, thereby causing the CEC or I/O frame to shut down. If power controller 58 continues to run, even though the CEC or I/O frame shut down, power controller 58 can detect and remember these failures because power controller 58 does not lose power. Detection of this type of utility power disturbance is not the subject of the present application. Rather, the present application is aimed at those utility power disturbances that cause both computer 40 and power controller 58 to shutdown, thereby losing all non-volatile memory of the event. And since the utility power disturbance can happen so quickly, there may be no time to create a non-volatile record of the event after it happens when power controller 58 loses power also. This problem in addressed, according to an aspect of the present invention, using a power state variable stored in non-volatile memory.

If a real component failure occurs, such as a power supply failure, and this failure causes the CEC or I/O frame to shutdown unexpectedly, there is no power-off request from the user. Such an event is not a utility power disturbance. Power controller 58 continues to operate since the component failure was not caused by a utility power disturbance. Power controller 58 detects the power supply failure and detects that the failure has caused the CEC or I/O frame to shutdown. In this case, the power state variable is written by power controller 58 to the second state just as if a user power-off request had occurred (because it is known that this event was not caused by a utility power disturbance). This technique may be used to avoid erroneously indicating that the system failure was due to a utility power outage when in fact it was not.

The VPD chip 70 includes a non-volatile memory, such as a non volatile random access memory (NVRAM), various types of programmable read only memory (PROM), complementary metal oxide semiconductor (CMOS) memory, flash memory, etc. The state variable is recorded in a field of the non-volatile memory of VPD chip 70. It should be appreciated that the state variable need not be recorded in the VPD chip 70, but may be recorded in any non-volatile memory associated with power system 54.

Figure 4:
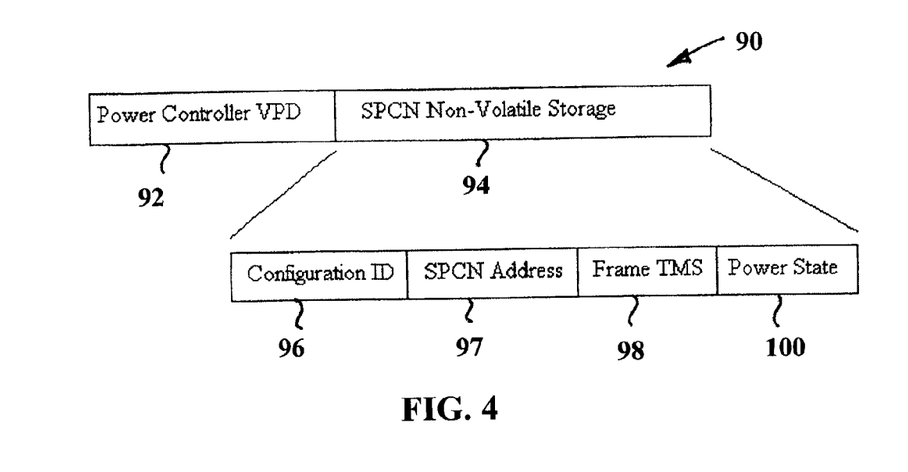
FIG. 4 is a block diagram showing an exemplary data format for a non-volatile memory of the VPD chip shown in FIG. 2.

FIG. 4 illustrates an example of a data format that may be used within a non-volatile memory 90 of VPD chip 70. Of course, other data formats may be used, and hence the present invention is not limited to the use of the data format shown in FIG. 4. The non-volatile memory 90 may be, for example, a 256 byte serial electronically erasable programmable read only memory (EEPROM). Of course, other sizes and types of non-volatile memory may be used, and hence the present invention is not limited to the use of the size and type of non-volatile memory set forth in this example. The non-volatile memory 90 contains a power controller VPD area 92 and a SPCN non-volatile storage area 94.

As is well known in the art, power controller VPD area 92 includes fields for storing vital product data for power controller 58, e.g., part number, serial number, manufacturing data, etc. The fields in power controller VPD area 92 are typically written when power controller 58 is manufactured.

SPCN non-volatile storage area 94 includes fields containing non-volatile variables used by power controller 58, such as a configuration ID field 96, an SPCN address field 97, a frame TMS field 98 and a power state field 100. Configuration ID field 96 identifies the configuration of the frame in which power controller 58 is installed so that the required number of power supplies, fans, etc. can be anticipated, as is well known in the art. Configuration ID field 96 is typically written when the computer is manufactured and in the field as needed (e.g., the configuration of the frame may change in the field from that at the time of manufacture).

SPCN address field 97 identifies the address of the frame in which power controller 58 is installed, as is well known in the art. For example, SPCN address 97 may be set forth in a RRU address format that is typically used for commands and responses transmitted over the SPCN. Such RRU address formats are well known in the art, and typically include a reserved field, a rack (or frame) address field, and a unit address field. Of course, other address formats may be used, and hence the present invention is not limited to the use of an RRU address format. SPCN address field 97 is typically written when the computer is manufactured and in the field as needed (e.g., the address of the frame may change in the field from that at the time of manufacture).

Frame TMS field 98 identifies the type, model and serial number of the entire CEC frame 82 or I/O frame 84 in which power controller 58 is installed, as is well known in the art. Frame TMS field 98 is typically written when the computer is manufactured and in the field as needed (e.g., the type, model and serial number of the frame may change in the field from that at the time of manufacture).

Of central importance to the present invention is power state field 100. Power state field 100 contains a state variable that identifies the power state of the frame in which power controller 58 is installed. Power state field 100 may be, for example, a single bit. The state variable is written by power controller 58 in a first state when the frame is powered on and operating. The state variable remains in the first state until it is changed to a second state by power controller 58 when the frame is powered off in response to a power-off request. Upon being powered up, e.g., once utility power 56 is restored following a utility power disturbance, power controller 58 reads the state variable in power state field 100 of non-volatile memory 90 in VPD chip 70. This allows power controller 58 to determine that a utility power disturbance has occurred when the state variable read by power controller 58 is in the first state. In other words, the frame shut down as a result of a utility power disturbance without benefit of the power-off request. This determination provides evidence that the shut down was the result of a utility power disturbance. Consequently, an unnecessary service call may be avoided, as well as unnecessary replacement of power system 54. Moreover, the use of a prior art detector (e.g., an AC loss detector), and its inherent cost and threshold related inconsistencies, can be avoided.

It should be appreciated that power state field 100 may be any size, and hence the present invention is not limited to the use of the 1 bit size set forth in the example above. For example, power state field 100 may be made larger, e.g., more than one bit to one or more bytes, to provide increased robustness. It may be desirable to use more than two states. An illustrative use of a third state follows. When power is applied to power controller 58 the first time after manufacture or replacement of the field replaceable unit (FRU) containing VPD chip 70, the state variable will contain an unknown value. With only two states, the unknown value will be interpreted as an indication a utility power disturbance has occurred while the frame was either powered up or powered down. By using a third state that indicates a manufacturing initialized value, this one time anomaly can be avoided.

Figure 5:
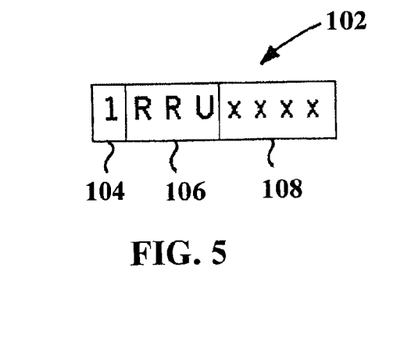
FIG. 5 is a block diagram showing an exemplary fault code format of an entry in the local error log shown in FIG. 2.

Preferably, power controller 58 maintains local error log 72 in RAM 62 that includes an entry based on the state variable accessed from power state field 100 in non-volatile memory 90 in VPD chip 70. FIG. 5 is a block diagram showing an exemplary fault code format of an entry 102 in local error log 72 that is preferably reported to operating system 76 for logging into system error log 80 and displayed on operator panel 74 (although it may be desirable to omit displaying a utility power disturbance code on operator panel 74 when the disturbance occurred in the past and is not a current active fault). Of course, other fault code formats may be used, and hence the present invention is not limited to the use of the fault code format is shown in FIG. 5. Local error log entry 102 includes a system fault field 104, a frame field 106 and a fault ID field 108. System fault field 104 distinguishes a failure in power system 54 from failures in other parts of computer system 40. For example, a "1" code in system fault field 102 may indicate a fault in power system 54, while other codes indicate faults in other parts of computer system 40. In this example, upon being powered up, e.g., once utility power 56 is restored following a utility power disturbance, power controller 58 writes a "1" code in system fault field 104 in entry 102 of local error log 72 in RAM 62. Of course, other codes may be used, and hence the present invention is not limited to the use of the code in this example.

Frame field 106 indicates which frame contains the fault. For example, frame field 106 may be set forth in a RRU address code format that is typically used to identify racks and units in systems utilizing a SPCN. Such RRU address code formats are well known in the art, and typically include a first reserved field, a second rack (or frame) address field, and a third unit address field. For instance, RRU=010 is frame 1 (e.g., CEC frame 82 in FIG. 3), while RRU=020 is frame 2 (e.g., I/O frame 84 in FIG. 3). Of course, other address code formats may be used, and hence the present invention is not limited to the use of a RRU address code format. In this example, upon being powered up, e.g., once utility power 56 is restored following a utility power disturbance, power controller 58 reads SPCN address field 97 of non-volatile memory 90 in VPD chip 70 and writes the RRU address code in frame field 106 in entry 102 of local error log 72 in RAM 62. Frame field 106 makes it possible to determine whether the utility power disturbance occurred in CEC frame 82 and/or I/O frame 84. A local error log 72 is maintained in I/O frame 84 by power controller 58', just as a local error log 72 is maintained in CEC frame 82 by power controller 58. If the utility disturbance occurred in both CEC frame 82 and I/O frame 84, one entry 102 will be written in each of their respective local error logs 72. The operating system accesses the local error logs maintained in CEC frame 82 and I/O frame 84 individually for entry into system error log 80. The operating system accesses the local error log maintained in I/O frame 84 through SPCN 86.

Fault ID field 108 indicates a particular fault through the use of a fault code. For example, a "00AD" code may designate a utility power disturbance that occurred while the frame was powered on, while a "00AE" code may designate a utility power disturbance that occurred while the frame was powered off. Of course, alternative fault codes may be used, and hence the present invention is not limited to the use of the codes in this example. In this example, upon being powered up, e.g., once utility power 56 is restored following a utility power disturbance, power controller 58 reads the state variable in power state field 100 of non-volatile memory 90 in VPD chip 70 and writes a fault code in fault ID field 108 in entry 102 of local error log 72 in RAM 62 based on the state variable.

Figure 6:
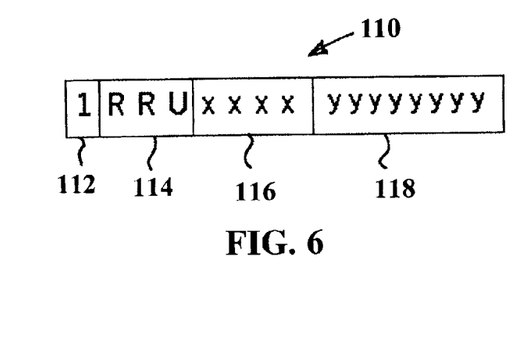
FIG. 6 is a block diagram showing an exemplary fault code format of an entry in the system error log shown in FIG. 2.

Operating system 76 preferably records an entry in system error log 80 in memory 44 based on local error log entry 102. FIG. 6 is a block diagram showing an exemplary fault code format of an entry 110 in system error log 80. Of course, other fault code formats may be used, and hence the present invention is not limited to the use of the fault code format is shown in FIG. 6. System error log entry 110 includes a system fault field 112, a frame field 114, a fault ID field 116 and a time stamp field 118. System fault field 112, frame field 114, and fault ID field 116 in system error log entry 110 are respectively identical to system fault field 104, frame field 106, and fault ID field 108 in local error log entry 102. Time stamp field 118 preferably includes a time field and a date field that are set each time an entry is made in system error log 110 by operating system 76. Alternatively, local error log entry 102 may include a time stamp field. In either case, time stamping the entries provides a timeline of utility power disturbance events.

Figure 7:
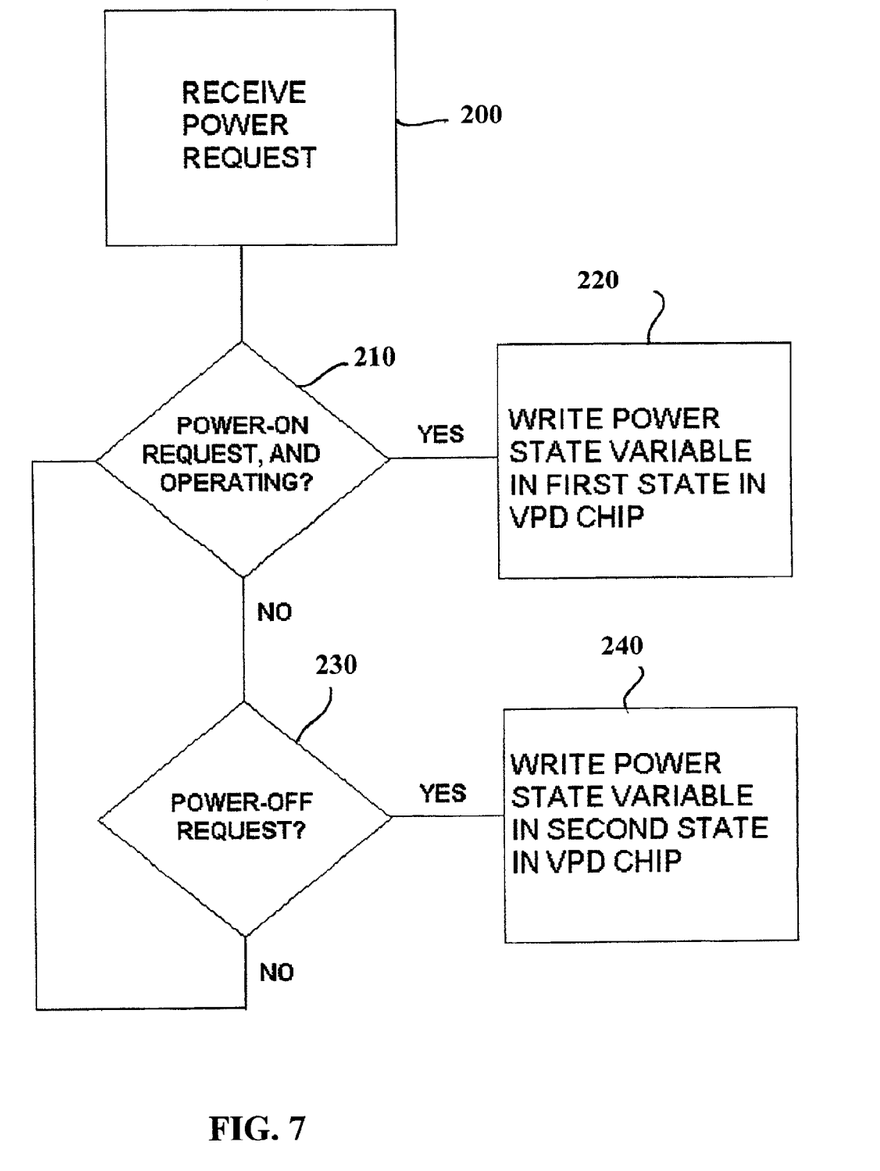
FIG. 7 is a flow diagram of steps occurring when the power controller writes the power state variable in the VPD chip.

FIG. 7 is a flow diagram of steps occurring when the power controller writes the power state variable in the VPD chip. At block 200, the power controller receives a power request, i.e., either a power-on request or a power-off request, from the operator panel. As is conventional, the power controller powers on the computer system in response to a power-on request and powers down the computer system in response to a power-off request. As is also conventional, in the case where the computer system includes a plurality of frames, the power controller in each of the respective frames powers on the frame in response to a power-on request and powers off the frame in response to a power-off request. At block 210, the power controller determines if a power-on request was received and, if so, whether the computer system (or frame) was successfully powered on. At block 220, if the power controller receives a power-on request and successfully powers on the computer system (or frame), the power controller writes the power state variable in the first state in the power state field of the non-volatile memory in the VPD chip. If the power controller did not receive a power-on request or did not successfully power on the computer system (or frame), the process moves to block 230. At block 230, the power controller determines if a powered-off request was received. At block 240, if the power controller receives a power-off request, the power controller writes the power state variable in the second state in the power state field of the non-volatile memory in the VPD chip. If the power controller did not receive a power-off request, the process returns to block 210.

Figure 8:
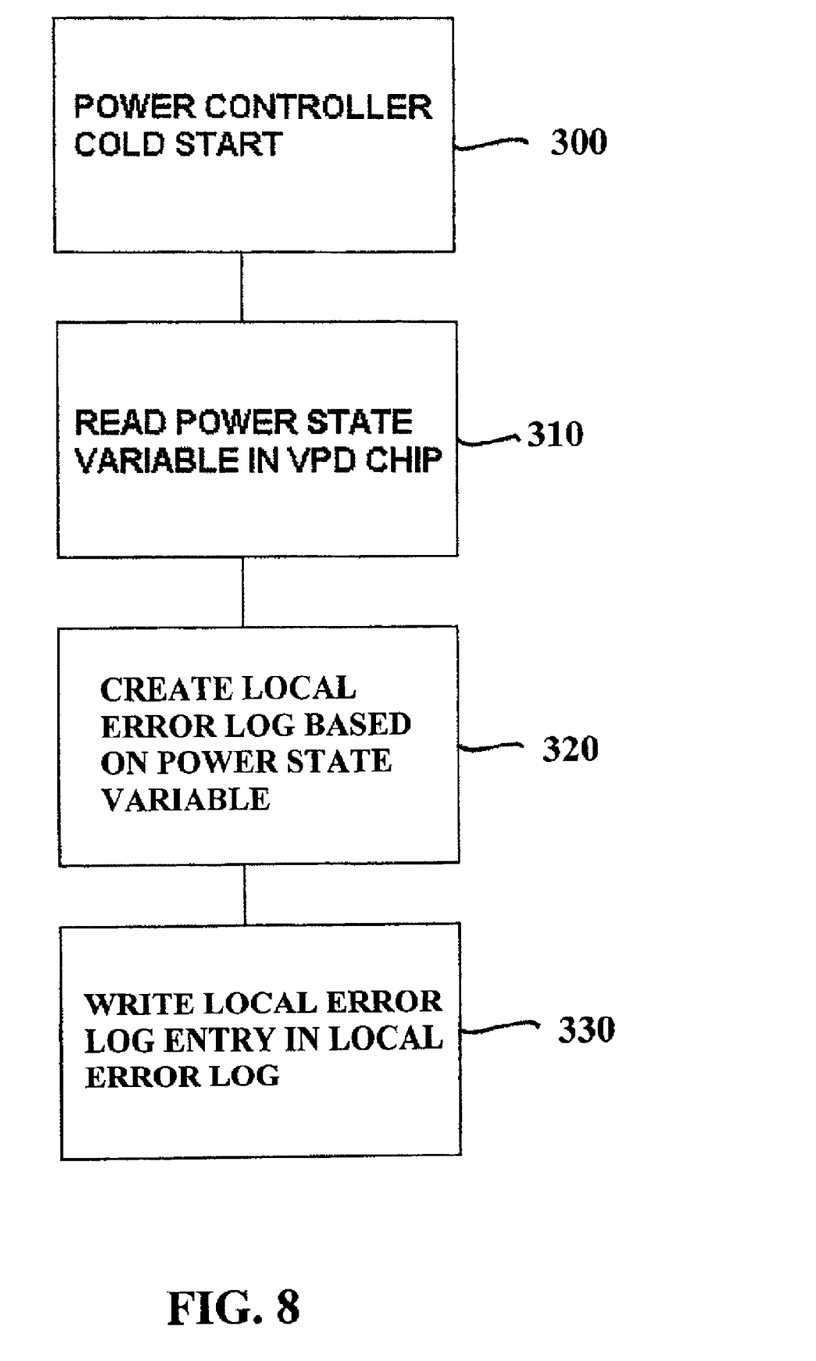
FIG. 8 is a flow diagram illustrating steps for creating a local error log entry and storing it in the local error log.

FIG. 8 is a flow diagram illustrating steps for creating the local error log entry and storing it in the local error log. At block 300, the power controller "cold starts". The power controller preferably operates in a standby mode when the computer system is powered off. Nonetheless, the power controller powers down, e.g., the contents of its volatile memory are lost, when the utility power is removed from the power system due to a utility power disturbance and powers up when the utility power is restored to the power system. The power up process of the power controller is referred to as a "cold start". During the cold start, the power controller loads programs from the ROM, including the POST program. At block 310, the POST program causes the power controller to read the state variable in the power state field of the non-volatile memory in the VPD chip. At block 320, the power controller creates a local error log entry based on the state of the power state variable. At block 330, the power controller writes the local error log entry in the local error log.

In the case where the computer system includes a plurality of frames, the power controller in each of the respective frames also reads the SPCN address field at block 310. In this case, at block 320, the power controller in each of the respective frames creates the local error log entry additionally based on the frame address. A local error log is maintained in the I/O frame by its power controller, just as a local error log is maintained in the CEC frame by its power controller. The operating system accesses the local error logs maintained in the CEC frame and the I/O frame individually for entry into the system error log. The operating system accesses the local error log maintained in the I/O frame through the SPCN.

Figure 9:
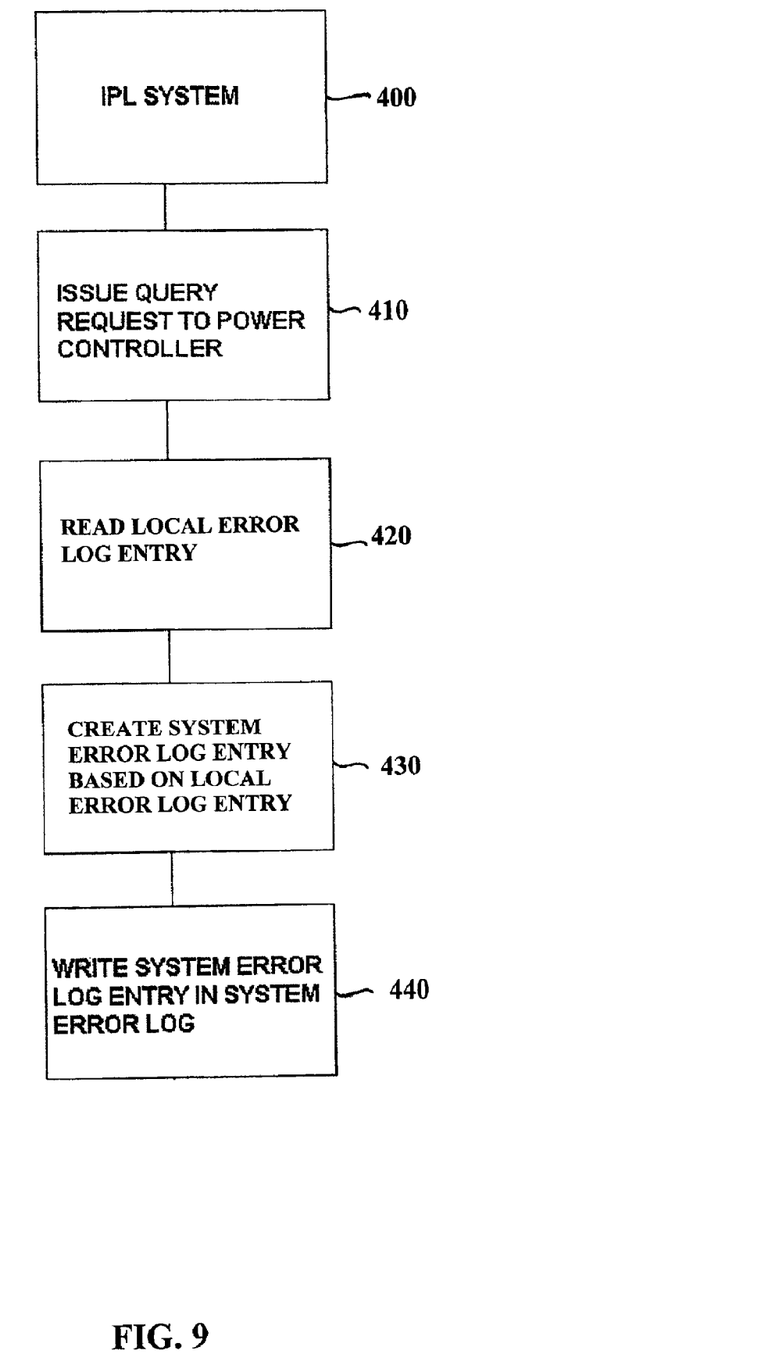
FIG. 9 is a flow diagram illustrating steps for creating a system error log entry and storing it in the system error log.

FIG. 9 is a flow diagram illustrating steps for creating a system error log entry and storing it in the system error log. At block 400, the process begins with the initial program load (IPL) of the computer system. At block 410, the operating system issues a query to the power controller for unreported events. Block 410 may occur during or after IPL. In response to the query, the power controller provides the operating system with access to the local error log. At block 420, the operating system reads the local error log entry from the local error log. At block 430, the operating system creates a system error log entry based on the local error log entry. Preferably, the operating system appends a time stamp field to the local error log entry at block 430. At block 440 the operating system writes the system error log entry in the system error log.

Typically, only active faults are displayed. Non-active faults, such as utility power disturbances, typically are not displayed because there is no service action to be taken. Utility power disturbances are posted to the system error log to provide evidence that a utility power disturbance (as opposed to power system components) caused the fault. So that the utility disturbance is not displayed, the operating system may decode the fault ID field of the various entries in the error log. If the decoding reveals an entry indicative of a utility power disturbance, or indicative of any other non-active fault, the operating system will not display that entry. The operating system will cause the remaining entries, i.e., the active faults, to be displayed. It should be appreciated, however, that all of the entries in the system error log are available for viewing by service personnel, whether the entries in it are actively displayed or not.

In the case where the computer system includes a plurality of frames, at blocks 410 and 420, the operating system queries and reads the local error log entry from the local error log in the CEC frame and the local error log entry from the local error log in the I/O frame. In this case, at blocks 430 and 440, the operating system creates and writes one system error log entry for each local error log entry.

While this invention has been described with respect to the preferred and alternative embodiments, it will be understood by those skilled in the art that various changes in detail may be made therein without departing from the spirit, scope, and teaching of the invention. Accordingly, the herein disclosed invention is to be limited only as specified in the following claims.

What is claimed is:

1. An apparatus for performing power fault analysis in a computer system, the computer system having a power system that includes a control device, wherein the power system receives utility power and applies power to at least one electrical component of the computer system, the apparatus comprising:
    an information circuit associated with the power system, the information circuit having a non-volatile memory field for storing a state variable,
        the state variable assuming a first state when the computer system is powered on and operating, wherein the state variable stays in the first state until the computer system is powered off in response to a power-off request,
        the state variable assuming a second state when the computer system is powered off in response to a power-off request, wherein the state variable stays in the second state until the computer system is powered on and operating,
        the state variable being read by the control device.

2. The apparatus as recited in claim 1, wherein the information circuit is a vital product data (VPD) circuit.

3. The apparatus as recited in claim 1, wherein the information circuit includes a memory selected from the group consisting of a programmable read only memory (PROM), non volatile random access memory (NVRAM), complementary metal oxide semiconductor (CMOS) memory and flash memory.

4. The apparatus as recited in claim 1, wherein at least a portion of the control device is powered down when the utility power is removed from the power system due to a utility power disturbance and powered up when the utility power is restored to the power system, and wherein the state variable is read upon powering up the portion of the control device.

5. The apparatus as recited in claim 4, wherein the control device operates in a standby mode when the computer system is powered off.

6. The apparatus as recited in claim 1, wherein the computer system has a CEC frame and a I/O frame each having one of the power systems, and wherein the control device of the power system in the CEC frame in coupled to the control device of the power system in the I/O frame by a system power control network (SPCN).

7. The apparatus as recited in claim 1, wherein the control device maintains a local error log that includes an entry based on the state variable accessed from the information circuit.

8. The apparatus as recited in claim 6, wherein the control device of the power system in the CEC frame maintains a local error log that includes an entry based on the state variable accessed from the information circuit associated therewith, and wherein the control device of the power system in the I/O frame maintains a local error log that includes an entry based on the state variable accessed from the information circuit associated therewith.

9. The apparatus as recited in claim 7, wherein the computer system has an operating system, and wherein the operating system accesses the local error log and records an entry in a system error log based on the contents of the local error log.

10. The apparatus as recited in claim 8, wherein the computer system has an operating system, and wherein the operating system accesses the local error log maintained in the CEC frame and records an entry in a system error log based on the contents thereof, and wherein the operating system accesses the local error log maintained in the I/O frame and records an entry in the system error log based on the contents thereof.

11. The apparatus as recited in claim 9, wherein the entry in the system error log is time stamped.

12. The apparatus as recited in claim 10, wherein the entries in the system error log are time stamped.

13. A computer-implemented method of performing power fault analysis in a computer system, the computer system having a power system that includes a control device, wherein the power system receives utility power and applies power to at least one electrical component of the computer system, the computer-implemented method comprising the steps of:

storing a state variable in a non-volatile memory field of an information circuit associated with the power system,
  the state variable assuming a first state when the computer system is powered on and operating, wherein the state variable stays in the first state until the computer system is powered off in response to a power-off request,
  the state variable assuming a second state when the computer system is powered off in response to a power-off request, wherein the state variable stays in the second state until the computer system is powered on and operating; and
reading the state variable from the information circuit with the control device.

14. The computer-implemented method as recited in claim 13, wherein at least a portion of the control device is powered down when the utility power is removed from the power system due to a utility power disturbance and powered up when the utility power is restored to the power system, and wherein the reading step is performed upon powering up the portion of the control device.

15. The computer-implemented method as recited in claim 14, wherein the control device operates in a standby mode when the computer system is powered off.

16. The computer-implemented method as recited in claim 13, wherein the computer system has a CEC frame and a I/O frame each having one of the power systems, and wherein the control device of the power system in the CEC frame in coupled to the control device of the power system in the I/O frame by a system power control network (SPCN), the computer-implemented method further comprising the steps of:

maintaining in the control device in the CEC frame a local error log that includes an entry based on the state variable assessed from the information circuit associated therewith;
maintaining in the control device in the I/O frame a local error log that includes an entry based on the state variable assessed from the information circuit associated therewith.

17. The computer-implemented method as recited in claim 13, further comprising the step of:
maintaining in the control device a local error log that includes an entry based on the state variable assessed from the information circuit.

18. The computer-implemented method as recited in claim 17, wherein the computer system has an operating system, the computer-implemented method further comprising the steps of:
the operating system accessing the local error log;
the operating system recording an entry in a system error log based on the contents of the local error log.

19. The computer-implemented method as recited in claim 16, wherein the computer system has an operating system, the computer-implemented method further comprising the steps of:
the operating system accessing the local error log maintained in the CEC frame;
the operating system recording an entry in a system error log based on the contents of the local error log maintained in the CEC frame;
the operating system accessing the local error log maintained in the I/O frame;
the operating system recording an entry in a system error log based on the contents of the local error log maintained in the I/O frame.

20. The computer-implemented method as recited in claim 18, wherein the recording step includes the step of time stamping the entry in the system error log.

21. The computer-implemented method as recited in claim 19, wherein the recording step includes the step of time stamping the entries in the system error log.

22. A program product for performing power fault analysis in a computer system, the computer system having a power system that includes a control device, wherein the power system receives utility power and applies power to at least one electrical component of the computer system, the program product comprising:
a signal bearing media; and
a program recorded on the signal bearing media, the program being capable of executing on a processor and containing a variable, the variable being in a first state when the computer system is powered on and operating, wherein the variable stays in the first state until the computer system is powered off in response to a power-off request, the variable being in a second state when the computer system is powered off in response to a power-off request, wherein the variable stays in the second state until the computer system is powered on and operating, the program storing the variable in a non-volatile memory field of an information circuit associated with the power system.

23. The program product as recited in claim 22, wherein at least a portion of the control device is powered down when the utility power is removed from the power system due to a utility power disturbance and powered up when the utility power is restored to the power system, and wherein the program reads the variable stored in the non-volatile memory field of the information circuit when the control device powers up.

24. The program product as recited in claim 23, wherein the control device operates in a standby mode when the computer system is powered off.

25. The program product as recited in claim 22, wherein the signal bearing media is recordable media.

26. The program product as recited in claim 22, wherein the signal bearing media is transmission type media.

* * * * *